UNITED STATES PATENT OFFICE 2,241,604

MANUFACTURE OF ARTIFICIAL STONE

Norman Victor Sydney Knibbs, New Barn, Longfield, and Alfred Petter Pehrson, Streatham, London, England, assignors to The Continental Investment Syndicate Limited, London, England No Drawing. Application February 4, 1936, Serial No. 62,298. In Great Britain February 12, 1935

21 Claims. (Cl. 25—155)

This invention relates to moulded building blocks, artificial stone, paving slabs, moulded pipes and posts, and like products which are produced by a process which consists in mixing ground lime and a siliceous and/or argillaceous material, which may be calcined, with water; moulding or otherwise forming the mixture to shape, and hardening by the action of steam at pressures above atmospheric; it also relates to articles such as building blocks which are made porous by the addition of aluminium dust or by other known means before hardening.

Hitherto it has generally been thought advisable to avoid the use of unhydrated lime in cementitious materials, but there have been proposals for using unhydrated lime and making provision for expansion while the material was setting in the moulds, in which case the moulds were specially constructed to withstand pressure.

We have discovered that it is possible to use unhydrated lime in such moulded or otherwise formed products without the necessity for forcibly restraining the material against expansion in the moulds while it is setting, and, moreover, that the inclusion of unhydrated lime has certain important advantages.

According to the present invention, a cementitious product is derived by causing the admixture of a siliceous and/or argillaceous material and quicklime with a compound of an oxy-acid of sulphur, adding water, moulding or otherwise shaping the mixture to the required form, allowing the lime in the mixture to hydrate and hardening by the action of steam under pressure. The moulded or otherwise formed article is first left for a period sufficient to allow hydration of substantially all the lime in the mixture and then hardened by treatment with steam under pressure.

When there is added to the mixture calcium sulphate (or other salt of an oxy-acid of sulphur), or when for the siliceous and/or argillaceous materials are selected ones which are rich in oxyacid of sulphur compounds, or rich in compounds which, through the subsequent treatment they receive in the process, will produce an oxy-acid of sulphur compound, we have found that provided there is sufficient water present to ensure hydration taking place in the presence of liquid, the lime hydrates without expansion or with only very slight expansion, and provided hydration of the lime is substantially complete before steam-hardening, there is no expansion during the hardening process. It is thought that the action of calcium sulphate controls hydration of the lime by virtue of the fact that the sulphate very rapidly goes into solution and the lime then hydrates in a solution of calcium sulphate.

It is necessary to avoid the use of a mixture too rich in quicklime or of too rapidly slaking lime, otherwise the heat generated through hydration raises the temperature in the mixture above the boiling point of the aqueous solution, in which case the lime may hydrate in the ordinary way, with expansion, and the block will be disintegrated or weakened. It may be indicated that at least 5% of the mixture is quicklime, and for all ordinary purposes with solid (i. e. non-cellular or so-called non-porous) articles the percentage would be from 10% up to about 20%, while on the other hand, where fluid mixtures containing large proportions of water are used, for example in making cellular or so-called porous blocks and like articles, the percentage of quicklime need never be less than 10 and may go considerably higher than the limit above stated. In mixtures as immediately above indicated the temperature would not normally go beyond that of the boiling point of the mixture, but in cases where a mixture very rich in lime is desired, the temperature may be kept down by using partially hydrated lime, or a mixture of quicklime and hydrated lime, instead of pure quicklime. The lime should preferably not be at all hard burnt and should be of a relatively rapid-slaking kind, otherwise the blocks have to be kept for a long time between moulding and steaming, with consequent disadvantages.

We have found that the rate of hydration of the lime can conveniently be controlled to some extent by variation of the temperature of the water used in mixing. The higher the temperature of the water used in the mixture is the quicker the mixture sets, but if the initial temperature of the water is too high, the mixture loses fluidity before it passes out of the mixture, and it is therefore convenient to use water at a temperature of 30–35° C. Should the lime in the mixture be very active, or should there be a high percentage of quicklime, the initial temperature should be less than that above stated.

In making solid, i. e. non-porous, blocks without artificially produced porosity, one method of carrying out the process may be outlined as follows: The lime is ground to a fineness of about 90 per cent passing a sieve of 100 meshes to the linear inch, and is mixed with the siliceous or argillaceous material, for example sand, in a proportion which may be 7 parts of sand to 1 part of lime, and 3 per cent of ground gypsum is added.

Water is added and mixed with the solids, the amount, which may be from 15 to 40 per cent, or within wider limits, being dependent on the nature of the material used and the proportion of lime. The mixture is made sufficiently wet to be suitable for moulding. The wet mixture is transferred to moulds, which may, if desired, be vibrated during or after filling, and the moulds are set aside for a period sufficient for the hydration of the lime, which period may be one or two hours, or may be overnight, by which time the block will have become sufficiently set for it to be withdrawn from the mould, it being sufficiently hard for all ordinary handling, and much harder than an unsteamed sand-lime brick. Before withdrawal from the mould, or at any time between filling and withdrawal, the material may be levelled off flush with the top of the mould, using a suitable knife or other device. The blocks are then transferred to an autoclave and subjected to the action of saturated steam under pressure, for example for 8 hours at 120 lbs. per square inch gauge pressure.

There are several advantages in the process described over that using fully hydrated lime. Hitherto the only satisfactory process has been that employed in making sand-lime bricks, in which process the mixture of sand and hydrated lime is mixed with just sufficient water to make it cohere when compressed, and the mixture moulded under high pressure to the form of bricks. Owing to the high moulding pressure required to give sufficient strength to permit handling in the unsteamed state and to give sufficient strength and density in the final product, the process is not economically applicable to large blocks. If more water is added so that the mixture can be moulded without pressure, in the same manner as, for example, concrete blocks are made, the final result is unsatisfactory because there is shrinkage and surface cracking or other defects develop during steaming. Moreover the blocks must be left in the moulds until steamed because they are too soft to handle. Furthermore, the steamed blocks are not as strong as sand-lime bricks made in the usual manner.

Blocks made according to the present invention do not shrink. During the hydration of the lime there appears to be a very slight expansion so that a sharp moulding is produced. The moulded block may be removed from the mould before steaming, thus economising in moulds and saving space in the autoclave. The blocks after hydration of the lime but before steaming are firm but not hard and are in a condition well adapted to scraping of the surface or other treatment to produce a finish of a desired kind. The amount of water required to produce a block suitable for moulding without pressure is less than when hydrated lime is employed, and a portion of this water is taken up by the lime in hydration, so that the water content of the block to be steamed is much less than it would be if hydrated lime were used in the mixture. In consequence, a much denser block may be produced and one of much higher strength. Unlike in the sand-lime brick process, large blocks may be made as readily as small ones.

In making porous blocks, one method of carrying out the process may be outlined as follows: China clay is calcined at a temperature of 800° to 1000° C., mixed with quicklime and gypsum and the mixture ground together to a fineness of about 75 percent passing a sieve of 200 meshes to the linear inch. The proportions used may be 77 per cent calcined clay, 20 per cent lime and 3 per cent gypsum. To the ground mixture is added aluminium dust in small amount, as for example 0.1 per cent. The mixture is then mixed with water to form a slurry, which ordinarily is much more fluid than when making solid blocks and which may, in the example considered, contain about 65 per cent of water of the weight of the mixed solids. The slurry is run into moulds, where it rises like leavened dough, owing to the gas generated by the aluminium powder. The porosity of the block may be controlled not only by the amount of aluminium or other agent added, but also by the amount and temperature of water used in mixing; for example we have found that with the admixed water at a temperature of 40° C. instead of 15° C., the porosity is doubled with powdered aluminium. After standing an hour or more the slurry will have set to a plastic or semi-plastic mass and before steaming the tops of the blocks may be struck off level and the blocks divided up by cutting, as mentioned below. They are then hardened by the action of steam under pressure as in the case of solid blocks. As in the previous example, the lime hydrates during standing and the mass sets, but it is not as hard as the solid blocks and ordinarily it is left in the moulds during the steaming process.

The use of quicklime has important advantages over the use of hydrated lime in making porous blocks. Ordinarily, the hydration of the lime proceeds simultaneously with gas production and the heat of hydration promotes the latter. By choosing correctly the quantity of water used in mixing, and also its temperature, the block will set (lose its fluidity) when, or soon after, gas production is complete, and this prevents loss of gas by coalesence of the bubbles to form large ones which rise to the surface. Such loss it is difficult to avoid when hydrated lime is used. These porous blocks may also be cut to size by means of knives after they have set but before steam-hardening, and in this way there is an economy in cost of production. As with solid blocks, the strength of porous blocks made from quicklime is higher than those made from hydrated lime.

We have found that it is possible to use a large number of different siliceous and argillaceous substances in our process and that these substances may be used either in the raw state or after calcination. In general, siliceous substances, such as sands, granite sands and chippings, and the like, are not improved by calcination, whilst clays and shales yield relatively poor results if they have not been calcined. We have found that the exact temperature of calcination of clay or shale does not directly influence the strength of the blocks made to any great extent, but a high temperature of calcination generally results in a lower quantity of water being required in mixing, which favours high strength. Furthermore, we have found that a rather high temperature of calcination generally results in a low moisture movement in the steamed blocks and many such materials, shales especially, may be heated to the point of sintering with advantage, but if heated to higher temperatures, to the point of fusing and forming a hard glass-like mass, the results are relatively inferior.

In our experiments we have found that colliery shale—the material mined with coal and discarded as valueless—is often suitable for making blocks of high quality by our process. Colliery shale, moreover, ordinarily contains sufficient sulphur, in the form of pyrites or otherwise, to produce in burning with limestone for effecting the necessary conversion of calcium carbonate to quicklime, sufficient calcium sulphate for the process to render the addition of more gypsum unnecessary. Low value oil shales or oil shale residues, and other bituminous shales, may be used in the same way. The desirable temperature of calcination is about 900–1000° C. The resulting calcined mixture is finely ground and is then ready for mixing with water and, for porous blocks, with aluminium.

It will be appreciated that although in the foregoing description the moulded articles referred to have been indicated as building blocks, the invention is not limited in this way; for example, it may be equally applicable to paving slabs, etcetera, and extends to all other articles such as pipes, posts, decorative mouldings, and in fact to most articles which ordinarily might be expected to be cast or moulded from concrete, plaster of Paris, and like products, or from articles formed from those materials upon a core or in a former of metal or other material. It is applicable to pipes and other articles moulded by centrifugal force as in the "Hume" process of making concrete pipes.

The invention further contemplates the addition to the mixture of aggregates, such for example as gravel, granite chippings, etcetera, and more especially it contemplates the addition of an asbestos aggregate to produce solid or porous articles of an asbestos cement nature.

What we claim is:

1. A method of making a precast artificial stone product that comprises mixing at least one of the materials defined as siliceous and argillaceous with quicklime and a compound of an oxy-acid of sulphur, adding water to hydrate the quicklime, shaping to the required form, and applying steam under pressure to harden.

2. A method of making a precast artificial stone product that comprises mixing quicklime with at least one of the materials defined as siliceous and argillaceous and containing or admixed with a compound of an oxy-acid of sulphur, adding water to hydrate the quicklime, shaping to the required form, and applying steam under pressure to harden.

3. A method of making a precast artificial stone product that comprises grinding, mixing and calcining calcium carbonate and at least one of the materials defined as siliceous and argillaceous and containing or admixed with a compound of an oxy-acid of sulphur, adding water to hydrate the quicklime produced in the calcination of the calcium carbonate, shaping to the required form, and applying steam under pressure to harden.

4. A method of making a precast artificial stone product that comprises mixing quicklime with at least one of the materials defined as siliceous and argillaceous and at least one of which materials contains or is admixed with a substance that when calcined with the quicklime yields a compound of any oxy-acid of sulphur, adding water to hydrate the quicklime, shaping to the required form, and applying steam under pressure to harden.

5. A method of making a precast artificial stone product that comprises mixing at least one of the materials defined as siliceous and argillaceous and containing or admixed with a compound of an oxy-acid of sulphur with a mixture of hydrated lime and at least 5 percent quicklime, adding water to hydrate the quicklime, shaping to the required form, and applying steam under pressure to harden.

6. A method of making a precast artificial stone product that comprises mixing with quicklime at least one of the materials defined as siliceous and argillaceous and at least one of which materials contains or is admixed with a substance that when calcined yields a compound of an oxy-acid of sulphur, adding water to hydrate the quicklime, shaping to the required form, and applying steam under pressure to harden.

7. A method of making a precast artificial stone product that comprises mixing at least one of the materials defined as siliceous and argillaceous with quicklime and a compound of an oxy-acid of sulphur, adding water to hydrate the quicklime, shaping to the required form, rendering the mass porous, and applying steam under pressure to harden.

8. A method of making a precast artificial stone product that comprises mixing at least one of the materials defined as siliceous and argillaceous with quicklime and a compound of an oxy-acid of sulphur, adding water to hydrate the quicklime, shaping to the required form, adding a gas-generating agent to the mass to render it porous, and applying steam under pressure to harden.

9. A method of making a precast artificial stone product that comprises mixing at least one of the materials defined as siliceous and argillaceous with quicklime and a compound of an oxy-acid of sulphur, adding water to hydrate the quicklime, shaping to the required form, adding powdered aluminum to the mass to render it porous, and applying steam under pressure to harden.

10. A method of making a precast artificial stone product that comprises mixing at least one of the materials defined as siliceous and argillaceous with quicklime and a compound of an oxy-acid of sulphur, adding water to hydrate the quicklime, placing the mass in a forming means, removing the hydrated mass from the forming means after it has become hardened sufficiently to permit handling, and applying steam under pressure to harden the mass further.

11. A method of making a precast artificial stone product that comprises mixing at least one of the materials defined as siliceous and argillaceous with quicklime and a compound of an oxy-acid of sulphur, adding water to hydrate the quicklime, shaping to the required form, varying the temperature of the added water to control the rate of hydration of the quicklime, and applying steam under pressure to harden.

12. A method of making a precast artificial stone product that comprises mixing at least one of the materials defined as siliceous and argillaceous with quicklime and a compound of an oxy-acid of sulphur, adding water to hydrate the quicklime, shaping to the required form, adding a gas-generating agent to the mass to render it porous, varying the temperature of the added water to control the gas generation, and applying steam under pressure to harden.

13. A method of making a precast artificial stone product that comprises mixing at least one of the materials defined as siliceous and argillaceous with quicklime and a compound of an oxy-acid of sulphur and an aggregate, adding water to hydrate the quicklime, shaping to the required form, and applying steam under pressure to harden.

14. A method of making a precast artificial stone product that comprises mixing with approximately three per cent gypsum at least one of the materials defined as siliceous and argillaceous and at least five per cent of which is quicklime in the proportion of approximately seven parts of the said material or materials to one part of the lime, adding water to hydrate the quicklime, shaping to the required form, and applying steam under pressure to harden.

15. A method of making a precast artificial stone product that comprises mixing approximately 77 percent calcined clay, 20 percent quicklime and 3 percent gypsum, adding water to hydrate the quicklime, shaping to the required form, and applying steam under pressure to harden.

16. A method of making a precast artificial stone product that comprises mixing approximately 77 percent calcined clay, 20 percent quicklime, 3 percent gypsum and a small amount of a gas-generating agent, adding water to hydrate the quicklime, shaping to the required form, and applying steam under pressure to harden.

17. A method of making a precast artificial stone product that comprises mixing approximately 77 percent calcined clay, 20 percent quicklime, 3 percent gypsum and 0.1 percent aluminum, adding water to hydrate the quicklime, shaping to the required form, and applying steam under pressure to harden.

18. A method of making a precast artificial stone product that comprises mixing sulphur-containing shale with calcium carbonate, calcining the shale and the calcium carbonate, thereby effecting inburning of the sulphur with the calcium carbonate to produce quicklime and an oxy-acid of sulphur compound, grinding the calcined mixture, adding water to hydrate the quicklime, shaping to the required form, and applying steam under pressure to harden.

19. A method of making a precast artificial stone product that comprises mixing sulphur-containing shale with calcium carbonate, calcining the shale and the calcium carbonate, thereby effecting inburning of the sulphur with the calcium carbonate to produce quicklime and an oxy-acid of sulphur compound, grinding the calcined mixture, adding a gas-generating agent, adding water to hydrate the quicklime, shaping to the required form, and applying steam under pressure to harden.

20. A method of making a precast artificial stone product that comprises mixing at least one of the materials defined as siliceous and argillaceous with quicklime and a small percentage of a lime-hydrating-controlling compound of an oxy-acid of sulphur, adding water to hydrate the quicklime, shaping to the required form, and applying steam under pressure to harden.

21. A method of making a precast artificial stone product that comprises mixing quicklime with at least one of the materials defined as siliceous and argillaceous and at least one of which materials contains or is admixed with a metallic sulphide that when calcined with the quicklime yields a compound of an oxy-acid of sulphur, adding water to hydrate the quicklime, shaping to the required form, and applying steam under pressure to harden.

NORMAN VICTOR SYDNEY KNIBBS.
ALFRED PETTER PEHRSON.